(12) United States Patent
Ryobo et al.

(10) Patent No.: US 6,488,310 B1
(45) Date of Patent: Dec. 3, 2002

(54) HYBRID INFLATOR

(75) Inventors: Eiichi Ryobo, Himeji (JP); Akihisa Ogawa, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/680,431

(22) Filed: Oct. 6, 2000

(30) Foreign Application Priority Data

Mar. 28, 2000 (JP) ........................................ 2000-089391

(51) Int. Cl.[7] .............................................. B60R 21/26
(52) U.S. Cl. ...................................... 280/736; 280/740
(58) Field of Search ............................... 280/736, 737, 280/740, 741

(56) References Cited

U.S. PATENT DOCUMENTS 5,456,492 A * 10/1995 Smith et al. ................. 280/737
6,189,922 B1 * 2/2001 Parks et al. .................. 280/735
6,234,523 B1 * 5/2001 Tokoro et al. ............... 280/737
6,253,683 B1 * 7/2001 Fukabori ..................... 280/737

FOREIGN PATENT DOCUMENTS

JP        8-282427 A        10/1996

* cited by examiner

*Primary Examiner*—Paul N. Dickson
*Assistant Examiner*—Faye M. Fleming
(74) *Attorney, Agent, or Firm*—Birch, Stewart, Kolasch & Birch, LLP

(57) ABSTRACT

A hybrid inflator in which a weight thereof and the number of manufacturing steps can be reduced is provided. First and second communication holes 125 and 135 by which first and second gas generating chambers 120 and 130 communicate with an inflator housing 102 are formed in a gas generator housing 105. Therefore, no screen is required and thus, the weight and the number of manufacturing steps can be reduced.

21 Claims, 3 Drawing Sheets

HYBRID INFLATOR

TECHNICAL FIELD TO WHICH THE INVENTION BELONGS

The present invention relates to an inflating-type safety system for a motor vehicle, more specifically to a hybrid inflator capable of inflating an air bag reliably and rapidly, and to an air bag system using the hybrid inflator.

1. Prior Art

With the development of an inflator for an inflating-type safety system of motor vehicles, a hybrid inflator using both a pressurized gas and a solid gas generating agent has been attracting attention. A main design requirement for a hybrid inflator is that the inflator inflates an air bag to a predetermined amount in a predetermined time so that the air bag is effectively activated. Various proposals concerning a structure to meet the requirement have heretofore been made (for example, as referred in JP-A 8-2824 27). Since such a hybrid inflator is manufactured to be installed in a motor vehicle, the weight and dimensions of the inflator, which have influence upon the weight of the motor vehicle, constitute an important design requirement therefor. And it is required to reduce the weight and number of parts while maintaining function as the hybrid inflator.

2. Disclosure of the Invention

An object of the present invention is to provide a hybrid inflator in which a weight of the inflator can be reduced and manufacturing process can be simplified, and to provide an air bag system using such a hybrid inflator.

A hybrid inflator of the present invention can be applied to any of a single type hybrid inflator having a single gas generating chamber and a multistage inflating hybrid inflator having two (dual type) or more than three gas generating chambers.

The present invention provides, as one means for solving the above problem, a hybrid inflator for an inflating-type safety system of a vehicle provided with an air bag, which comprises an inflator housing, a gas generator provided in the inflator housing, and an ignition means chamber having an ignition means joined to the gas generator, wherein the interior of the inflator housing is filled with a pressurized medium containing an inert gas, the gas generator has an outer shell formed by a gas generator housing having a plurality of communication holes, the gas generator includes, in the gas generator housing, a gas generating chamber which accommodates a gas generating agent, the gas generating chamber and the inflator housing are in communication with each other through the communication holes, each of the communication holes provided in the gas generator housing has such a size that combustion gas generate in the gas generating chamber can flow out therethrough but the gas generating agent can be prevented from leaking outside.

This hybrid inflator is of a single type having one gas generating chamber. It is possible to prevent the gas generating agent from leaking outside without using a leak-blocking screen by adjusting a size (hole diameter) of the plurality of the communication holes. Since the screen for covering the communication holes by which the inflator housing communicates with the gas generating chamber provided in the gas generator housing is not used, a weight of the hybrid inflator can be reduced by a weight of the screen. Further, since a mounting step of the screen is unnecessary, the number of manufacturing steps can be reduced, and the manufacturing step can be simplified.

Further, as another means for solving the above problem, the present invention provides a hybrid inflator for an inflating-type safety system for a vehicle provided with an air bag, which comprises an inflator housing, a gas generator provided in the inflator housing, and an ignition means chamber having ignition means connected to the gas generator, wherein the gas generating agent can be prevented from leaking outside. pressurized medium containing an inert gas, the gas generator has an outer shell formed by a gas generator housing having a plurality of first and second communication holes, the gas generator housing includes, therein, first and second gas generating chambers each having a gas generating agent, the first gas generating chamber and the inflator housing are in communication with each other through the first communication holes, the second gas generating chamber and the inflator housing are in communication with each other through the second communication holes, each of the first and/or second communication holes has such a size that combustion gas generated in the first and/or second gas generating chamber can flow out therethrough but the gas generating agent can be prevented from leaking outside.

In the present invention, the following three modes may be employed: (a) the plurality of the first communication holes are not covered by the screen, but the plurality of the second communication holes are covered by the screen, (b) the first communication holes are covered by the screen, but the second communication holes are not covered by the screen, and (c) both the first and second communication holes are not covered by the screen. Among these embodiments, (c) is most preferable.

This hybrid inflator is of a dual-type having two gas generating chambers. Like the above-described single type hybrid inflator, it is possible to prevent the gas generating agent from leaking outside by adjusting a size (hole diameter) of the first and second communication holes without using a screen. Since the screen for covering the plurality of the communication holes by which the inflator housing communicates with the gas generating chambers provided in the gas generator housing is not used, a weight of the hybrid inflator can be reduced by a weight of the screen. Further, since a mounting step of the screen can be omitted, the number of manufacturing steps can be reduced, and thereby, the manufacturing step can be simplified. In a conventional dual-type hybrid inflator, a screen is mounted on each of the first and second communication holes. Since the screens are not used, the number of parts can be reduced by two, and since the mounting step of the two screens can be omitted, effects of reducing a weight and simplifying manufacturing steps are extremely great.

In the hybrid inflator of the present invention, the plurality of the communication holes or the plurality of the first and second communication holes provided in the gas generator housing can have the same hole diameters. By setting the hole diameters of the communication holes to the same, it becomes easy to control the amount of outflow and the outflow state of combustion gas generated by burning the gas generating agent, and additionally, manufacture of the gas generator housing can be facilitated.

In the hybrid inflator of the present invention, plurality of the communication holes or the plurality of the first and second communication holes provided in the gas generator housing may have hole diameters in a range of 0.5 to 3 mm, more preferably in a range of 1.0 to 2.0 mm. By setting the hole diameter of each of the plurality of the communication holes or the plurality of the first and second communication holes in the predetermined range, the amount of outflow and the outflow-state of a combustion gas generated by combustion of the gas generating agent can be controlled easily.

And, in the hybrid inflator of the present invention, the total number of the communication holes or the first and second communication holes provided in the gas generator housing may be 100 to 600, more preferably 200 to 500. By setting the total number of the communication holes or the first and second communication holes in a predetermined range, the amount of outflow and the outflow-state of a combustion gas generated by combustion of the gas generating agent can be controlled easily.

And, in the dual-type hybrid inflator of the present invention, the total number of the first communication holes may be 50 to 300, more preferably 100 to 250, and the total number of the second communication holes may be 50 to 300, more preferably 100 to 250. By setting the total number of the first and second communication holes in a predetermined range, the amount of outflow and the outflow-state of a combustion gas generated by combustion of the gas generating agent can be controlled easily.

And, in the hybrid inflator of the present invention, the total open area of the communication holes or the first and second communication holes provided in the gas generator housing may be 100 to 600 $mm^2$, more preferable 200 to 500 $mm^2$. By setting the total open area of the communication holes or the first and second communication holes in the predetermine range, the amount of outflow and the outflow-state of a combustion gas generated by combustion of the gas generating agent can be controlled easily.

And, in the hybrid inflator of the present invention, the plurality of the communication holes or the plurality of the first and second communication holes provided in the gas generator housing may be arranged in a plurality of lines in the longitudinal direction of the gas generator housing as well as in a plurality of lines in the outer peripheral direction. By arranging the communication holes in plurality of the lines, requirements concerning the hole diameter, the total number and the opening area of the communication holes can be controlled easily, and thereby, the hybrid inflator which fulfills the requirements can be produced efficiently.

Further, as another means for solving the above problem, the present invention provides a hybrid inflator for an inflating-type safety system of a vehicle provided with an air bag, which comprises an inflator housing, a gas generator provided in the inflator housing, and an ignition means chamber having ignition means connected to the gas generator, wherein the interior of the inflator housing is filled with a pressurized medium containing an inert gas, the gas generator has an outer shell formed by a gas generator housing having a plurality of first and second communication holes, the gas generator housing includes, therein, first and second gas generating chambers each having a gas generating agent, a first ignition means. chamber having first ignition means is connected to a first gas generating chamber, a second ignition means chamber having second ignition means is connected to a second gas generating chamber, the first gas generating chamber and the inflator housing are in communication with each other through a plurality of the first communication holes, the second gas generating chamber and the inflator housing are in communication with each other through a plurality of the second communication holes, each of the first and/or second communication holes has such a size that combustion gas generated in the first and second gas generating chambers can flow out therethrough but the gas generating agent can be prevented from leaking outside, the second communication holes are disposed:at a distance from the second ignition means in the widthwise direction and/or the longitudinal direction of the inflator housing.

In this invention, the expression "the second communication holes are disposed at a distance from the second ignition means in the widthwise direction and/or the longitudinal direction of the inflator housing" includes three states from the second ignition means, i.e. a state in which the second communication holes are disposed at a distance in the widthwise direction, a state in which the second communication holes are disposed at a distance in the longitudinal direction, and a state in which the second communication holes are disposed at a distance in both widthwise and longitudinal directions. The widthwise direction of the inflator housing means a direction/on toward the side-walls of the inflator housing with respect to the center axis of the inflator housing in its longitudinal direction.

When the second communication holes are disposed at a distance in the widthwise direction of the inflator housing, it is preferable that all of the second communication holes are disposed in different directions from the second ignition means in the widthwise direction of the inflator housing. When the communication holes are disposed in different directions in the widthwise direction of the inflator housing, it is preferable that all of the second communication holes are directed to a direction different from the second ignition means through 90° or greater in the widthwise direction.

In the hybrid inflator of the present invention, like the above-described single type hybrid inflator, it is possible to prevent the gas generating agent from leaking outside by adjusting a size (hole diameter) of each of the first and/or second communication holes without using a leak-blocking screen. And, since such a screen can be omitted, the weight of the inflator can be reduced, the manufacturing step can be simplified, and leaking of the gas generating agent can be prevented. With respect to relation between the first and second communication holes and the screen, the above-described three modes, (a)–(c), can be employed, and the mode (c) if most preferable.

And, in the hybrid inflator of the present invention when the second communication holes and the second ignition means are disposed close to each other (i.e., when they are disposed such that the widthwise direction of the inflator housing is the same direction as an example thereof shown in FIG. 3, all the gas generating agent can be burned smoothly and uniformly by employing the above-described arrangement. Without the above arrangement, in general, the gas generating agent near the second communication holes is burned smoothly, but there is an adverse possibility that gas generating agent away from the second communication holes is not burned smoothly.

The gas generating agent used in the hybrid inflator of the present invention is not specially limited, and one example thereof is shown below. In the hybrid inflator of the present invention, as shown in 1) and 2) below, a gas generating agent accommodated in one gas generating chamber for a single type hybrid inflator, or a first gas generating,agent accommodated in the first gas generating chamber and a second gas generating agent accommodated in the second gas generating chamber for a dual type hybrid inflator can be determined based on a relation with composition of pressurized medium charged in the inflator housing.

1) the pressurized medium including oxygen:

When the pressurized medium consists of oxygen and an inert gas such as argon, helium (nitrogen is also included in the inert gas in the present invention), etc., the oxygen works to convert carbon monoxide and hydrogen generated due to the combustion of a gas generating agent as gas generating means into carbon dioxide and vapor, while the inert gas works to promote the thermal expansion of the pressurized medium. It is preferable to contain helium in the pressurized medium since the leakage of the pressurized medium can be detected easily, for the purpose of preventing distribution of the imperfect products. Concrete compositions of the pressurized medium including oxygen are determined in accordance with gas generating agent to be used and a kind thereof, and the content of oxygen is preferably about 8 to 30 mol %. A charging pressure of the pressurized medium (=pressure in the inflator housing) is preferably 10,000 to 70,000 kPa and more preferably, 30,000 to 60,000 kPa.

As the gas generating agent in the single type hybrid inflator and the dual type hybrid inflator, a gun propellant can be used for example. As the gun propellant, a single-base gun propellant, a double-base gun propellant and a triple-base gun propellant can be used. In addition to them, it is possible to use a gun propellant obtained by mixing a secondary explosive, a bonding agent, a plasticizer and a stabilizer and the like, and molding the resultant mixture to a desired shape.

The secondary explosive can include hexahydrotrinitrotriazine (RDX), cyclotetramethylene tetranitramine (HMX), pentaerithritol tetranitrate (PETN) an triaminoguanidine nitrate (TAGN). For example, when a gas generating agent using RDX as a secondary explosive is burned in an oxygen-absent atmosphere under a pressure of 20,670 kpa and at a combustion temperature of 3348 K, a formed gas in a combustion gas comprises 33 mol % of nitrogen, 25 mol % of carbon monoxide, 23 mol % of vapor, 8 mol % of carbon dioxide and other gas components.

The bonding agent can include cellulose acetate, cellulose acetate butylate, cellulose acetate propiolate, ethyl cellulose, polyvinyl acetate, azide polymer, polybutadiene, polybutadiene hydride and polyurethane; the platicizer can include trimethylolethane trinitrate, butantriol trinitrate, nitroglycerine, bis (2,2-dintropropyl) acetal/formal, glycidyl azide and acetyltriethl citrate and the like; and the stabilizer can include ethlcentralite, diphenylamine and loesosinol.

A preferable ratio of the secondary explosive to the bonding agent, plasticizer and stabilizer is about 50 to 90 wt. % of secondary explosive to about 10 to 50 wt. % of bonding agent, plasticizer and stabilizer in all.

It is difficult in some cases to burn the gas generating agent of the above-described composition under normal pressure. However, in the hybrid inflator according to the present invention, since the interior thereof is maintained at a high pressure in advance, the gas generating agents can be burned stably and smoothly.

2) the pressurized medium not including oxygen:

When the pressurized medium consists of substantially an inert gas such as argon, helium (nitrogen is also included in the inert gas in the present invention), etc., the inert gas works to promote the thermal expansion of the pressurized medium. It is preferable to contain helium in the pressurized medium since the leakage of the pressurized medium can be detected easily for the purpose of preventing distribution of the imperfect products. A charging pressure of the pressurized medium is preferably 10,000 to 70,000 kPa and more preferably, 30,000 to 60,000 kPa.

As the gas generating agent accommodated in the single type hybrid inflator and the dual type hybrid inflator, it is possible to use a material including fuel and oxidizer, or fuel, oxidizer and slug-forming agent which are mixed together with bonding agent if necessary and formed into a desired shape. If such a gas generating agent is used, a gas generated by its combustion can be supplied together with the pressurized medium for developing the air bag. Especially when the gas generating agent including the slug-forming agent is used, the amount of mist discharged from the inflator can be, reduced much.

Preferably, the fuel can be one or two or more materials selected from a group consisting guanidinie derivative such as nitroguanidine (NQ), guanidine nitrite (GN), guanidine carbonate, amino nitroguanicine, amino guanidine nitrite, amino guanidine carbonate, diamino guanidine nitrite, diamino guanidine carbonate, and triamino guanidine nitrite. Further as the fuel, one or two or more materials selected from a group comprising tetrazole and tetrazole derivative can be used As oxidizer, one or two or more materials selected from a group comprising strontium nitrate, potassium nitrate, ammoniumnitrate, potassium perchlorate, copper oxide, ferrous oxide, basic copper nitrate can be used. Preferable composition amount of oxidizer is 10 to 80 parts by weight, and more preferably, 20 to 50 parts by weight with respect to 100 parts by weight of fuel.

Preferably, the slug-forming agent can be one or two or more materials selected from a group consisting of acid clay, talc, bentonite, diatomaceous earth, kaolin, silica, alumina, sodium silicate, silicon nitride, silicon carbide, hydrotalsite, and a mixture thereof. Preferable composition amount of slug-forming agent is 0 to 50 parts by weight, and more preferably, 1 to 10 parts by weight with respect to 100 parts by weight of fuel.

Preferably, the bonding agent can be one or two or more materials selected from a group consisting of sodium salt of sodium carboxymethylcellulose, hydroxyethyl cellulose, starch, polyvinyl alcohol, guar gum, microcrystal cellulose, polyacrylamide and calcium stearate. Preferable composition amount of the bonding agent is 0 to 30 parts by weight, and more preferably, 3 to 10 parts by weight with respect to 100 parts by weight of fuel.

When the pressurized medium and the gas generating agent having the above-described compositions are used, it is preferable that a molar ratio (A/B) between an amount (A mol) of the pressurized medium and an amount (B mol) of a gas generated due to combustion of the gals generating agent is adjusted to 8/2 to 1/9, and more preferably 8/2 to 3/7.

As described above, the charging amount of the pressurized medium can be reduced by adjusting the molar ratio between the amount of pressurized medium charged in the hybrid inflator and the amount of a gas generated by combustion of the gas generating agent. Therefore, even when the volume of the inflator housing is reduced (i.e., even when the length and/or width (diameter) of the housing is reduced), it is possible to maintain the pressure at the same level as that before the volume is reduced, without enhancing the charging pressure (internal pressure of the housing) of the pressurized medium. In the hybrid inflator of the present invention, the weight ratio (a/b) of the weight (a) of the pressurized medium to the weight (b) of the gas generating agent is preferably 0.1 to 7, and more preferably 1 to 7.

In the above hybrid inflator, it is preferable that a pressure index determined by the following formula: $rb={}^{\alpha}P^{n}$ (wherein, rb: burning rate, $\alpha$: coefficient, P: pressure, n: pressure index), at the combustion of the gas generating agent, is smaller than 0.8. The pressure index (n) is preferably 0.2 to 0.7, and more preferably, 0.4 to 0.6.

The pressure index (n) is obtained from two formulas, i.e., $rb_1 = {}^\alpha P_1{}^n$ and $rb_2 = {}^\alpha p_2{}^n$, after a burning rate $rb_1$ is measured in a pump having a pressure $P_1$ (70 kg/cm$^2$), and a burning rate $rb_2$ is measured in a pump having a pressure $P_2$ (100 kg/cm$^2$).

When the pressure index (n) is set to smaller than 0.8 in this manner, the burning rate at the initial state of the combustion of the gas generating agent is restrained from increasing abruptly, whereby, increase of the pressure inside the housing is small. Accordingly, a sufficient pressure resistance of the housing can be maintained even if the thickness of the housing is reduced. Further, since the increase in the internal pressure of the housing is small (i.e. a variation in the internal pressure is small), the gas generating agent is burned stably so that all the gas generating agent is burned completely.

In the hybrid inflator of the present invention, as a relation between the pressurized medium and the gas generating agent, the above-described combinations 1) and 2) may be employed, and the combination 2) is more preferable.

Further, the present invention provides an air bag system comprising activation-signal outputting means including an impact sensor and a control unit, and. a module which accommodates the above-described hybrid inflator and air bag, wherein the inflating speed of the air bag, can be adjusted.

In the present invention, the term "gas generator" is the one having a gas generating performance to generate a high temperature combustion gas due to combustion of the gas generating means (gas generating agent) in the gas generator housing (gas generating chamber), thereby allowing the high temperature combustion gas to flow into the inflator housing. The hybrid inflator includes the gas generator in its inflator housing, and the term "inflator" is the one having a performance to flow outside, the pressurized medium existing inside of the inflator housing as well as outside of the gas generator to inflate an object to be inflated such as an air bag by flowing a high temperature combustion gas from the gas generator into the housing. The term "hybrid" means a combination of the high temperature combustion gas generated by combustion of the gas generating agent and the pressurized medium.

In the hybrid inflator of the present invention, since the leak-blocking screen, for covering the communication holes by which the inflator housing communicates with the gas generating chamber provided in the gas generator housing, is not used, the number of parts and manufacturing steps can be reduced, and thereby the cost can be effectively reduced because of weight-reduction of the hybrid inflator and the facilitated manufacturing process.

DESCRIPTION OF NUMERALS

Figure 1:
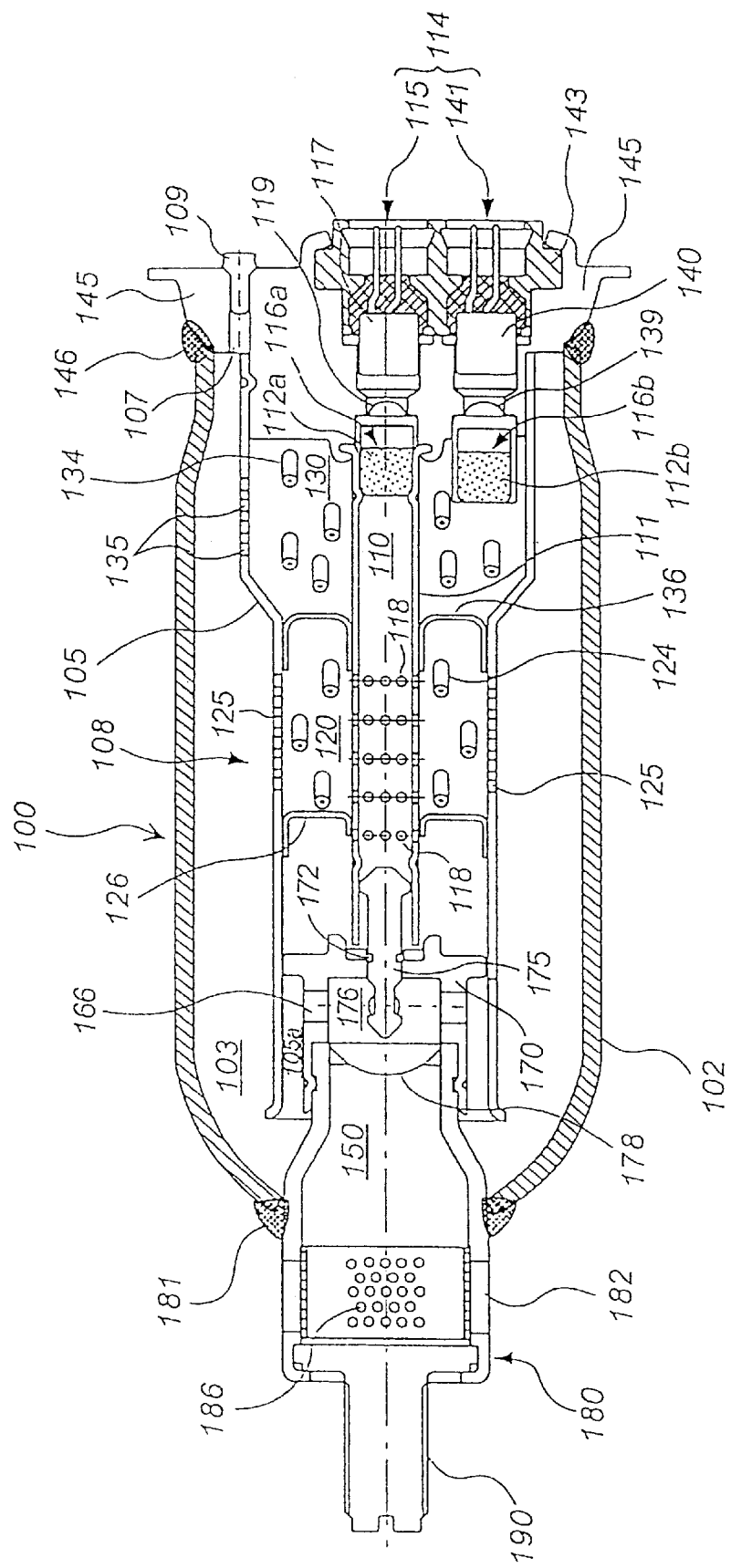
FIG. 1 is a longitudinal sectional view showing one embodiment of a hybrid inflator of the present invention.

100 hybrid inflator
102 inflator housing
105 gas generator housing
110 flame transferring means chamber
120 first gas generating chamber
124 first gas generating agent
125 first communication hole
130 second gas generating chamber
134 second gas generating agent
135 second communication hole

PREFERRED EMBODIMENT OF THE PRESENT INVENTION

The present invention will be explained in detail as follows with reference to the drawings showing embodiments of the invention.

Figure 2:
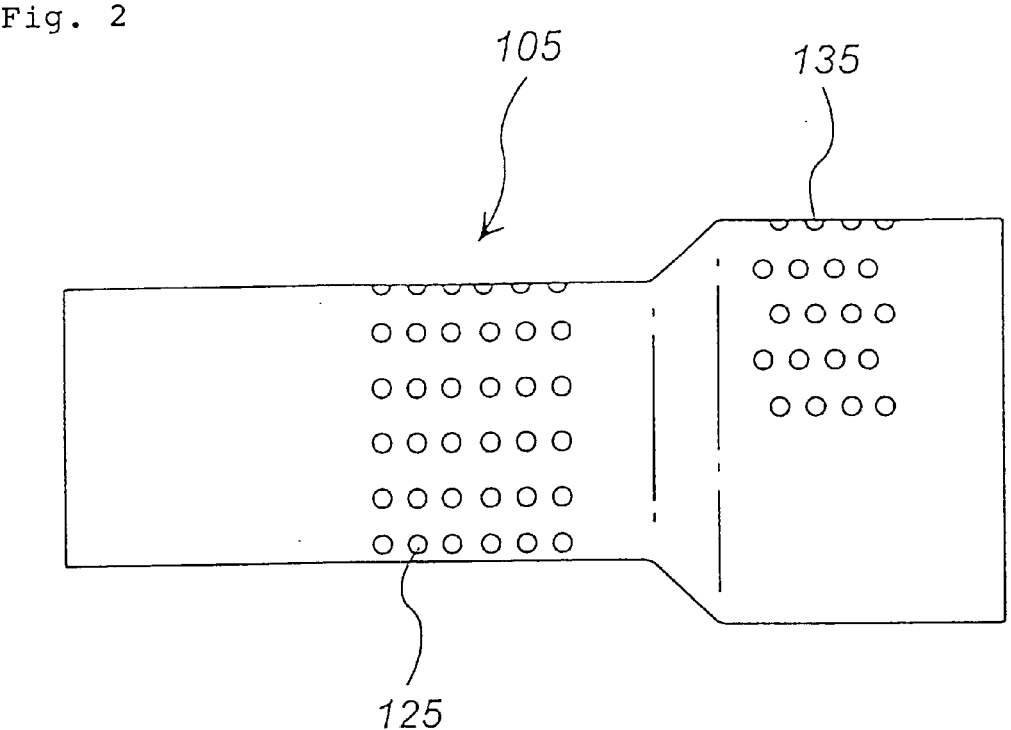
FIG. 2 is a schematic plan view of a gas generator housing in the hybrid inflator shown in FIG. 1.
Figure 3:
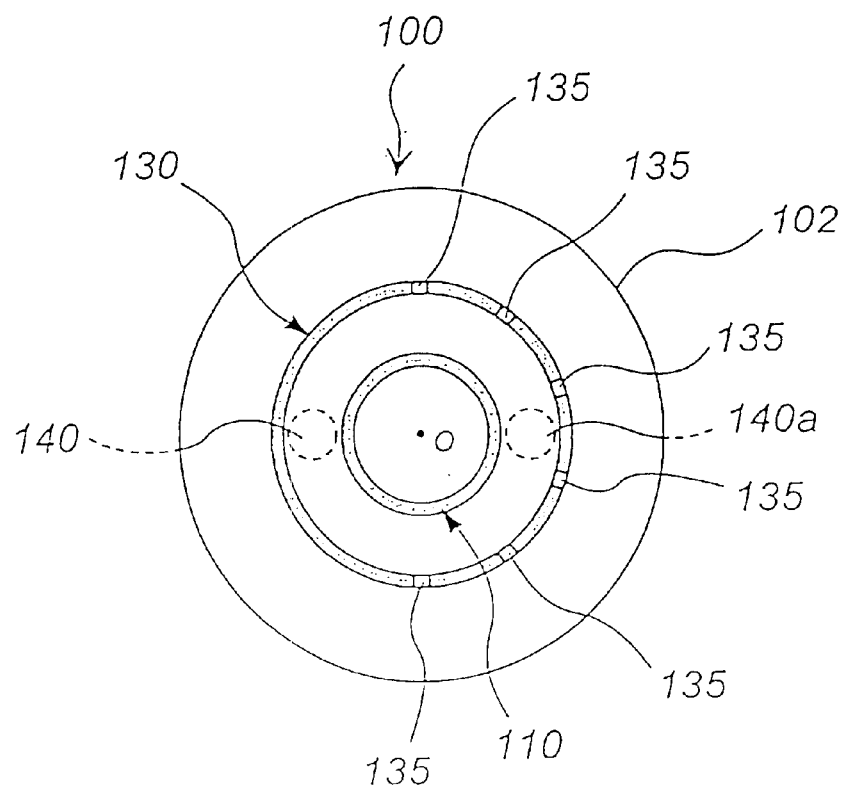
FIG. 3 is a schematic sectional view of a second gas generating chamber in the widthwise direction thereof shown in FIG. 1.

FIG. 1 is a longitudinal sectional view showing one embodiment of a dual type hybrid inflator 100 having two gas generating chambers, FIG. 2 is a schematic plan view of the gas generator housing shown in FIG. 1, and FIG. 3 is a schematic sectional view of a second gas generating chamber taken along the widthwise direction thereof shown in FIG. 1. FIGS. 2 and 3 are used for explaining the layout of communication holes.

As shown in FIG. 1, an inflator housing 102 comprises a cylindrical pressure resisting container, and its inner space 103 is filled with a pressurized medium and maintained at a high pressure. The pressurized medium is usually charged from a small hole 107 formed in a boss 145 connected to one end of the inflator housing 102, and the small hole 107 is closed a seal pin 109 after the pressurized medium was charged. The inflator housing 102 can be formed to have an uniform outer diameter except its end portion on the side of a diffuser 180.

An outer shell of a gas generator 108 is formed by a gas generator housing 105. The gas generator 108 includes, therein, a flame transferring means chamber 110, and a first gas generating chamber 120 and a second gas Generating chamber 130 formed to surround the flame transferring means chamber 110 and disposed adjacent to each other in series in the longitudinal direction of the inflator housing 102. The gas generator 108 is disposed in the inflator h using 102, and its one end in its longitudinal direction is fixed to the boss 145 by welding.

The flame transferring means chamber 110 comprises a cylindrical housing 111, and is connected to a first igniter 117 through a booster cup 116a in which a booster agent (transfer charge) 112a is charged and a first communication passage closed by a first rupturable disc 119 as a first closing means. The flame transferring means chamber 110 is in communication with the first gas generating chamber 120 through flame transferring holes 118.

The first gas generating chamber 120 is disposed to surround the flame transferring means chamber 110, and is defined by the gas generator housing 105, the housing 111 of the flame transferring means chamber 110, a first partition wall (first retainer) 126 and a second partition wall (second retainer) 136. A desired amount of a first gas generating agent 124 is accommodated in the first gas generating chamber 120. The first gas generating chamber 120 and the inflator housing 102 are in communication with each other through a plurality of first communication holes 125.

As shown in FIG. 2, a plurality of the first communication holes 125 are disposed in six lines (six holes) in the longitudinal direction of the gas generator housing 105, and disposed on the entire surface of the gas generator housing 105 in the outer peripheral direction. A hole diameter of the first communication hole is 1.2 mm, and the total number of the first communication holes is 192, and the total opening area is 217 mm². A plurality of the first communication holes 125 may not be disposed on the entire surface in the outer peripheral direction and may be disposed on a portion of the surface or on a plurality of surfaces at an appropriate distance from one another.

In the hybrid inflator 100 of the present embodiment, since a screen for preventing the first gas generating agent 124 from leaking out is not provided and thus, the first communication holes 125 and the first gas generating agent 17 are in contact with each other.

The second gas generating chamber 130 is formed of the gas generator housing 105, the housing 111 of the flame transferring means chamber 110, the second partition wall (second retainer) 136, and the boss 145 (and second rupturable disc 139). A desired amount of a second gas generating agent 134 as a gas generating agent is accommodated in the second gas generating chamber 130. The second gas generating chamber 130 and the inflator housing 102 are in communication with each other through a plurality of the second communication holes 135.

As shown in FIG. 2, a plurality of the second communication holes 135 are disposed in the longitudinal direction of the gas generator housing 105 in four lines (four holes), and disposed on a half of the surface of the gas generator housing 105 in its outer peripheral direction (see FIG. 3). As shown in FIG. 2, the four communication holes arranged in the longitudinal direction are disposed such that the longitudinal lines comprising the four holes adjacent in the circumferential direction are unevenly positioned in the longitudinal direction but alternate lines are evenly positioned in the longitudinal direction. A diameter of the second communication hole is 1.2 mm, and the total number of the second communication holes is 128, and the total opening area is 145 mm². A plurality of the communication holes 13 may be disposed only on a portion of the surface or on plural portions of the surface at an appropriate distance from o another.

In the hybrid inflator 100 of the present embodiment, since a screen for preventing the second gas generating agent 134 from leaking out is not provided and thus, the second communication holes 135 and the second gas generating agent 134 are in contact with each other.

The second gas generating chamber 130 is connected to a second igniter 140 through a second communication passage closed by a second rupturable disc 139 as the second closing means. A reference number 112b represents a booster agent, and a reference number 116b represents a booster cup.

Since the first igniter 117 (first ignition means 115) and the flame transferring means chamber 110 are disposed on the center axis (shown with the chain line in FIG. 1, and with a center point O in FIG. 3) in the longitudinal direction of the inflator housing 102, the second igniter 140 is disposed eccentrically to the center axis. Therefore, as shown in FIG. 3, the second gas generating chamber 130 is formed such that the second communication holes 135 are located on the opposite side of the second igniter 140 in the widthwise direction (radial direction). When the second communication holes 135 and the second igniter 140 are disposed close to each other, for example, (when the second igniter is located at the position 140a shown with the broken line in FIG. 3), the second communication holes 135 and the second igniter 140a are disposed to be in the same direction in the widthwise direction of the inflator. Therefore, gas generating agent 134 in the vicinity of the second igniter 140a can be burnt well, but gas generating agent 134 existing on the opposite side cannot be burnt enough.

Figure 4:
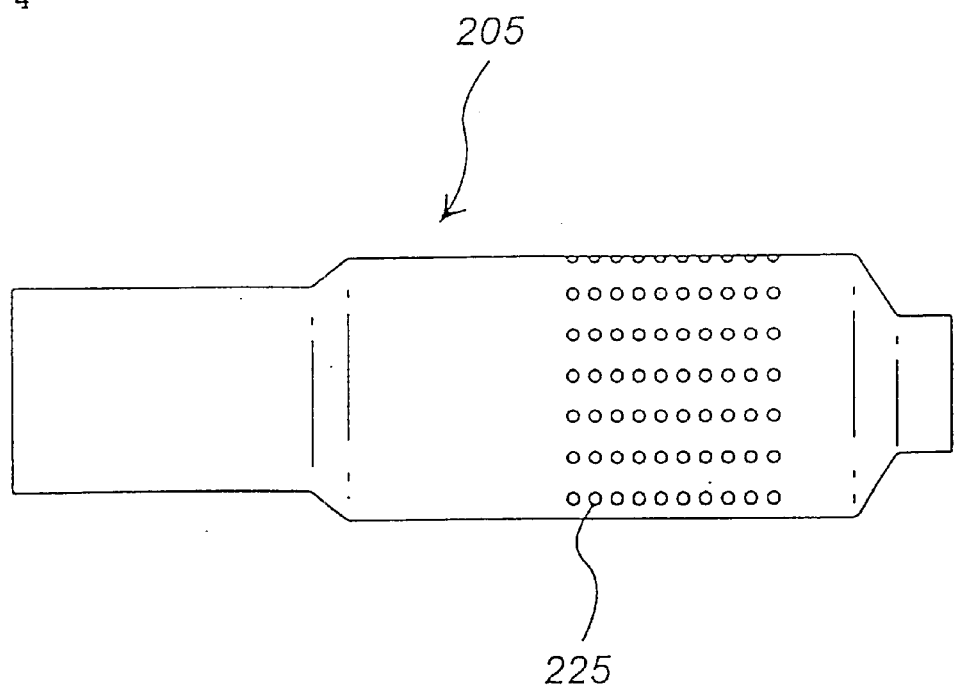
FIG. 4 is a schematic plane view of the gas generator housing of another embodiment of the hybrid inflator of the invention.

FIGS. 1 to 3 show the dual type inflator having two gas generating chambers. An example in which the present invention is applied to a single type inflator having one gas generating chamber is shown in FIG. 4. In the case of the single type hybrid inflator having a gas generator housing 205 shown in FIG. 4, a plurality of communication holes 225, by which the single gas generating chamber communicates with the inflator housing, are disposed in ten lines (ten holes) in the longitudinal direction of the gas generator housing 205 and, at the same time, disposed on the entire surface thereof in the outer circumferential direction. In this case, the communication holes 225 may not be disposed on the entire surface in the outer peripheral direction and may be disposed on a portion of the surface or on plural portions of the surface at an appropriate distance from one another. A hole diameter of the communication hole 225 is 1.2 mm, and the total number of the communication holes is 320, and the total opening area is 362 mm².

Figure 5:
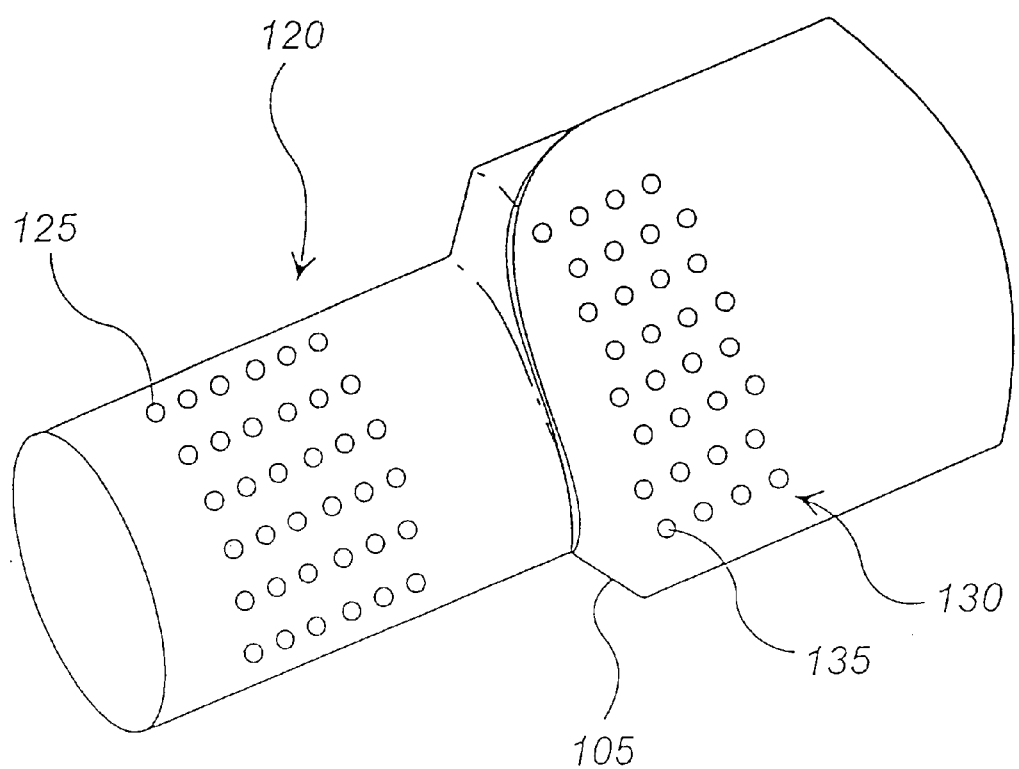
FIG. 5 is a schematic plan view of the gas generator housing of another embodiment of the hybrid inflator of the invention.

In the hybrid inflator 100 shown in FIG. 1, irrespective of whether or not the second igniter 140 is disposed eccentrically, the first communication holes 125 and the second communication holes 135 can be formed such that some or all of the holes are directed differently in the widthwise direction of the inflator housing in order to prevent mist from discharging outside. Next, one embodiment of the layout of the first communication holes 125 and second communication holes 135 will be explained based on FIG. 5. In FIG. 5, a surface of the gas generator housing 105 on the side of the second gas generating chamber 130 is cut out.

As shown in FIG. 5, a plurality of the first communication holes 125 are formed only on one surface of the gas generator housing 105, and a plurality of the second communication holes 135 are formed only on the opposite surface of the gas generator housing 105. By disposing the first communication holes 125 and the second communication holes 135 on the widthwise-opposite sides, facing each other, of the surface of the gas generator housing 105, when a mist (first mist) generated by burning the first gas generating agent 124 in the first gas generating chamber 120 flows out from the first communication holes 125 and adheres to an opposite inner wall surface of the gas generator housing 105, a gas flow (second gas flow) generated by combustion of the second gas generating agent 134 in the second gas generating chamber 130 flows into the opposite side of the inner wall surface of the gas generator housing 105 on which the first mist adheres. Therefore, the first mist is prevented from scattering due to the second gas flow and from flowing outside of the hybrid inflator 100.

An amount of the second gas generating agent 134 can be equal to, larger or smaller than an amount of the first gas generating agent 124, and shapes and compositions of the first and second gas generating agents may be the same or different from each other. Volumes of the first gas generating chamber 120 and the second gas generating chamber 130 may be the same or different from each other, and the volumes clan be adjusted by the first partition wall 126 and the second partition wall 136.

As described above, the flame transferring means chamber 110 is in communication with the first gas generating chamber 120, the first gas generating chamber 120 is in communication with the inflator housing 102, and further, the second gas generating chamber 130 is in communication with the inflator housing 102. with this structure, pressures in the flame transferring means chamber 110, the first gas generating chamber 120 and the second gas generating chamber 130 are maintained at high level, i.e., at the same level as the pressure in the inflator housing 102 (inner space 103).

The first gas generating chamber 120 and the second gas generating chamber 130 are disposed adjacent to each other in series in the longitudinal direction of the inflator housing 102. By disposing these chambers in series in this manner, even when the gas generating chamber is divided into two, the entire size of the hybrid inflator can be made compact, and weight increase can be limited.

The first gas generating chamber 120 and the second gas generating chamber 130 have independent passages through which gases generated by the respective combustion of the first gas generating agent 124 and the second gas. generating agent 13 flow into the inflator housing 102. That is, the gas generate in the first gas generating chamber 120 flows into the inflator housing 102 from the first communication holes 125, and the gas generated in the second gas generating chamber 130 flows into the inflator. housing 102 from the second communication holes 135.

The first and second gas generating chambers 120, 130 are disposed in such a manner that, when the gas generated in the first gas generating chamber 120 flows towards a diffuser port 182 inside the inflator housing 102 after passing through the first communication holes 125 of an inflow passage, the second communication holes 135 which is an inflow passage of the second gas generating chamber 130 is located in the reverse direction of the gas flowing direction with respect to the first communication holes 125 which is an inflow passage of the first gas generating chamber 120.

By disposing the first and second gas generating chambers 120, 130 in this manner, combustion in the first gas generating chamber 120 does not affect the one in the second gas generating chamber 130. Such a layout is effective in that combustion in the first gas generating chamber 120 does not affect the one in the second gas generating chamber 130 when the pressurized medium does not contain oxygen. The order of disposing the first gas generating chamber 120 and the second gas generating chamber 130 may be reversed.

An ignition means chamber 114 formed in the boss 145 includes the first and second ignition means chambers 115, 141 The first ignition means chamber accommodates the first ignite 117, and the second ignition means chamber accommodates the second igniter 140. The first and second ignition means chambers can be disposed in parallel, adjacent to each other in the widthwise direction of the inflator housing 102.

The first igniter 117 and the second igniter 140 are mounted to the boss 145 through an igniter collar 143. The boss 145 is fixed to the inflator housing 102 at a connecting portion 146 by welding or the like.

An adapter 170 is connected to the gas generator housing 105 in extension of the flame transferring means chamber 110. A projectile 175 having the illustrated shape for rupturing a main rupturable disc 178 at the time of activation is mounted, through an O-ring 172, to an opening that brings the flame transferring means chamber 110 and the adapter 170 into communication with each other such that the projectile 175 straddles the flame transferring means chamber 110 and the adapter 170. A tip end of the projectile 175 is located in the inner space 176 of the adapter 170. The inner space 176 and the inner space 103 of the inflator housing 102 are in communication only through a required number of gas inflow holes 166 provided on a surface of the adapter 170 facing an inner surface of the housing 105. A gas flow path 105a is formed by the inner surface of the housing 105 and an outer surface of the adapter 170. Therefore, the pressurized medium in the inner space 103 flows into the gas inflow holes 166 inevitably through the gas flow path 105a at the time of activation.

A diffuser 180 is connected to one end of the inflator housing 102. The diffuser 180 is fixed at its connecting portion 181 by welding. The main rupturable disc 178 as the main closing means is mounted to the end of the diffuser 180 facing the profectile 175 in order to block a moving path of the pressurezed medium towards the diffuser port 182 before activation. Therefore, before activation, a gas inflow space 150 and the inner space 103 of the inflator housing 102 are completely isolated from each other and thus, transmittance of the pressurized medium is blocked.

The diffuser 180 is provided at the other end with a plurality of diffuser ports 182 for sending the pressurized medium to the air bag and also with a diffuser screen 186 for removing fine particles. A stud bolt 190 for connecting the diffuser 180 with the air bag module is fixed to the outer face of the diffuser 180.

In the hybrid inflator 100, it is preferable that the above-described constituent elements are arranged symmetrically in the widthwise direction with respect to the center axis (shown as the chain line in FIG. 1), but some or all of the constituent elements may be arranged eccentrically with respect to the center axis.

In the hybrid inflator of the present invention, the arrangement of the first and second gas generating chambers can be varied as described below.

For example, the first gas generating chamber 120 an the second gas generating chamber 130 can be arranged to face each other on the opposite sides inside the inflator housing 102. In this case, the pressurized medium is charged into the space between the first gas generating chamber 120 and the second gas generating chamber 130.

Further, for example, in the inflator housing 120, the first gas generating chamber 120 (or the second gas generating chamber 130) may be disposed to surround the flame transferring means chamber 110, and the second gas generating chamber 130 (or the first gas generating chamber 120) may be disposed to surround the first gas generating chamber 120.

The air bag system of the present invention comprises an activation-signal outputting means including an impact sensor and a control unit, and a module case in which the hybrid inflator 100 and an air bag are accommodated. The hybrid inflator 100 is connected to the activation-signal outputting means (the impact sensor and the control unit) on the side of the first igniter 117 and the second igniter, 140, and the hybrid inflator 100 is connected and fixed by screwing the stud bolt 190 into the module case in which the air bag is mounted. In the air bag system having such a structure, it is possible to adjust an amount of gas generated in accordance with a degree of the impact, and to adjust the inflating speed of the air bag by appropriately setting the output condition of the activation signal in the activation-signal outputting means.

Next, the operation of the hybrid inflator 100 will be explained with reference to FIG. 1. Before the hybrid inflator 100 is activated, the pressurized medium/stored in the inflator housing 102 under a high pressure has flowed into the first gas generating chamber 120 and the second gas generating chamber 130 which communicate with each other by means of the communication holes 125 and 135 respectively, and further has flowed into the flame transferring means chamber 110 through the communication holes 118, and the insides of these chambers are maintained at the same high pressure. Further, the projectile 175 is mounted so as to straddle between the flame transferring means chamber 110 and the inner space 176 which are maintained at the same pressure, the malfunction is prevented.

In the event of a vehicle collision, the first igniter 117 is ignited by the activation signal outputting means to rupture the first rupturable disc 119 (fixed to the boss 145 forming the first communication hole 113) to ignite and burn the booster agent 112a in the flame transferring means chamber 110, thereby generating a high temperature booster gas.

When the pressure inside the flame transferring means chamber 110 is increased by the generated booster gas, the projectile 175 pushed by this pressure moves to rupture the main rupturable disc 178 with the sharp tip end of the projectile 175. At that time, a portion of booster gas flows into the gas inflow space 150 due to the rupture of the main rupturable disc 178.

Most of the booster gas flows into the first gas generating chamber 10 through the flame-transferring holes 118 to ignite and burn the first gas generating agent 124, and a desired amount of a high temperature combustion gas (corresponding to the charged amount of first gas generating agent 124) is generated. At that time, since the pressurized medium has flowed into the first gas generating chamber 120 so that this chamber 120 has been maintained at a high pressure, the combustion of the first gas generating agent 124 is stable. Since the flame transferring means chamber 110, the first gas generating chamber 120 and the second gas generating chamber 130 are partitioned from each other by a cylindrical housing 11 and a second partition wall 136, the second gas generating agent 134 is not ignited and burned. Because of the arrangement of the first communication hole 125 of the first gas generating chamber 120 and the second communication holes 135 of the second gas generating chamber 130, the second gas generating agent 134 is not ignited nor burnt by the combustion of the first gas generating agent 124.

Thereafter, since the high temperature combustion gas flows through the first communication hole 125 into the inflator housing 102 to increase the pressure therein, the further pressurized medium flows into the gas inflow space 150 through the ruptured main rupturable disc 178. The further pressurized medium which has flowed into the gas inflow space 150 in this manner is ejected from the diffuser port 182 after passing through the diffuser screen 186 and then, inflates the air bag mounted in the air bag module.

The second ignitor 140 is ignited by the activation signal outputting means simultaneously when or slightly (about 10 to 40 ms)after the first ignitor 134 is activated, and the second rupturable disc 139 (fixed to the boss 145 forming the second communication passage 133) is ruptured to ignite and burn the booster agent 112b, and then, the second gas generating agent 134 in the second gas generating chamber 130 is ignited to generate the desired amount of a high temperature combustion gas (corresponding to the charged amount of the second gas generating agent 134) At that time, since the pressurized medium has flowed into the second gas generating chamber 130 and this chamber 130 has been maintained at high pressure, the combustion state of the second gas generating agent 134 is stable.

Further, as shown in FIGS. 1 and 3, since the second igniter 140 is disposed distantly and differently in the radial direction from the second communication holes 135, the second gas generating agent 134 in the second gas generating chamber 130 is uniformly burned. For example, if the second communication holes 135 is disposed near the second igniter 140, a portion of the second gas generating agent 134 near the second igniter 140 is smoothly burned, but the other portion of the second gas generating agent 134 located away from the second communication holes 135 is prone too be burned in some cases.

The high temperature combustion gas generated by the combustion of the second gas generating agent 134 flows into the inflator housing 102 through the second, communication holes 135 to increase a pressure therein, the remaining further pressurized medium flows into the gas inflow space 150 through the ruptured main rupturable disc 178, and is ejected from the diffuser port 182 to further inflate the air bag.

The hybrid inflator described above generates the combustion gas in two stages. The first gas generating chamber 120 can act to inhibit an inflating action of the air bag from lagging at a vehicle collision, and the second gas generating chamber 130 enables to act the pressurized medium to be discharged completely from the inflator housing 102 and to make the air bag inflated immediately up to the satisfying safety level.

Additionally, since two gas generating chambers are provided, this hybrid inflator can also be adapted to a mode of embodiment in which a combustion gas is generated only in the first gas generating chamber 120 alone, a mode of embodiment in which a combustion gas is generated in the first and second gas generating chambers 120 and 130 simultaneously, and a mode of embodiment in which an interval between the timing of generating a combustion gas in the first gas generating chamber 120 and that of generating a combustion gas in the second gas generating chamber 130 is controlled in a desired manner.

What is claimed is:

1. A hybrid inflator for an inflating-type safety system of a vehicle provided with an air bag, comprising:
    an inflator housing filled with a pressurized medium containing an inert gas;
    a gas generator provided in said inflator housing, said gas generator including,
        an outer shell formed by a gas generator housing having communication holes,
        a gas generating chamber in which a gas generating agent is accommodated,
        said gas generating chamber and said inflator housing being in communication with each other through said communication holes;
    an ignition means chamber containing ignition means connected to said gas generator,
    wherein, each of said communication holes provided in said gas generator housing has such a size that a combustion gas generated in said gas generating chamber is permitted to flow out therethrough into said inflator housing while preventing the gas generating agent from moving out of said gas generating chamber.

2. A hybrid inflator for an inflating-type safety system of a vehicle provided with an air bag, comprising:
    an inflator housing filled with a pressurized medium containing an inert gas;
    a gas generator provided in said inflator housing, said gas generator including, an outer shell formed by a gas generator housing having a plurality of first and second communication holes, first and second gas generating chambers each containing a gas generating agent, said first gas generating chamber and said inflator housing being in communication with each other through said first communication holes, and said second gas generating chamber and said inflator housing being in communication with each other through said second communication holes; and an ignition means chamber having an ignition means connected to said gas generator, wherein each of at least one of said first and second communication holes has such a size that combustion gas generated in at least one of said first and second gas generating chambers can flow out therethrough into said inflator housing while preventing the gas generating agent in the at least one of said first and second combustion chamber from moving out therefrom, and wherein said first and second gas generating chambers are disposed in one of parallel, adjacent to each other, and at a distance from each other in the widthwise direction of said inflator housing.

3. A hybrid inflator for an inflating-type safety system of a vehicle provided with an air bag, comprising:

an inflator housing filled with a pressurized medium containing an inert gas;

a gas generator provided in said inflator housing, and including, an outer shell formed by a gas generator housing having a plurality of first and second communication holes, first and second gas generating chambers each containing a gas generating agent, a first ignition means chamber, having first ignition means, connected to a first gas generating chamber, and a second ignition means chamber, having second ignition means, connected to a second gas generating chamber, said first gas generating chamber and said inflator housing being in communication with each other through said first communication holes, and said second gas generating chamber and said inflator housing being in communication with each other through said second communication holes; and an ignition means chamber containing ignition means connected to said gas generator, wherein, each of at least one said first and second communication holes has such a size that combustion gas generated in at least one of said first and second gas generating chambers is permitted to flow out therethrough while preventing the gas generating agent from moving out therefrom, and said second communication holes are disposed at a distance from said second ignition means in at least one of the widthwise direction and the longitudinal directions of said inflator housing.

4. A hybrid inflator as claimed in any one of claims 1 to 3, wherein the communication holes or the plurality of first and second communication holes provided in said gas generator housing are not covered with a screen.

5. A hybrid inflator as claimed in any one of claims 1 to 3, wherein said gas generating agent is in contact with a plurality of the communication holes or the at least one of the plurality of first and second communication holes provided in said gas generator housing.

6. A hybrid inflator as claimed in any one of claims 1 to 3, wherein the communication holes or the plurality of first and second communication holes provided in said gas generator housing have the same hole diameters.

7. A hybrid inflator as claimed in any one of claims 1 to 3, wherein the communication holes or the plurality of first and second communication holes provided in said gas generator housing have hole diameters in a range of 0.5 to 3 mm.

8. A hybrid inflator as claimed in any one of claims 1 to 3, wherein the total number of the communication holes or the plurality of first and second communication holes provided in said gas generator housing is 100 to 600.

9. A hybrid inflator as claimed in claim 2 or 3, wherein, in the plurality of first and second communication holes provided in said gas generator housing, the total number of said first communication holes is 50 to 300, and the total number of said second communication holes is 50 to 300.

10. A hybrid inflator as claimed in any one of claims 1 to 3, wherein the total open area of the communication holes or the plurality of first and second communication holes provided in said gas generator housing is 100 to 600 mm$^2$.

11. A hybrid inflator as claimed in any one of claims 1 to 3, wherein the communication holes or the plurality of first and second communication holes provided in said gas generator housing are disposed in a plurality of lines in the longitudinal direction of said gas generator housing as well as in a plurality of the lines in the circumferential direction.

12. A hybrid inflator as claimed in any one of claims 1 to 3, wherein a portion or all of the plurality of first and second communication holes provided in said gas generator housing are formed in different directions in the widthwise direction of said inflator housing.

13. A hybrid inflator as claimed in claim 3, wherein, in the plurality of first and second communication holes provided in said gas generator housing, a plurality of the first communication holes provided in said gas generator housing are disposed in a plurality of the lines in the longitudinal direction of said gas generator housing as well as on the entire surface in the circumferential direction, and a plurality of the second communication holes provided in said gas generator housing are disposed in a plurality of the lines in the longitudinal direction of said gas generator housing as well as on a half or less of the surface in the circumferential direction.

14. A hybrid inflator as claimed in claim 3 or 13, wherein said gas generator further includes a flame transferring means chamber, said flame transferring means chamber is disposed in extension in the longitudinal direction of said first ignition means chamber and is in communication with said first gas generating chamber, said second ignition means connected to said second gas generating chamber is disposed eccentrically with respect to the center axis of said inflator housing in the longitudinal direction.

15. A hybrid inflator as claimed in claim 3 or 13, wherein said first and second ignition means chambers are disposed adjacent to each other as well as in parallel in the widthwise direction of said inflator housing, said first ignition means chamber is disposed on the center axis in the longitudinal direction of said inflator housing.

16. A hybrid inflator as claimed in claim 2 or 3, wherein said first and second gas generating chambers have independent inflow paths for gases generated therein towards said inflator housing.

17. A hybrid inflator as claimed in claim 2 or 3, wherein said first and second gas generating chambers are disposed adjacent to each other in series in the longitudinal direction of said inflator housing.

18. A hybrid inflator as claimed in claim 2 or 3, wherein said first and second gas generating chambers are disposed to face each other in series in the longitudinal direction of said inflator housing.

19. A hybrid inflator according to claim 3, wherein said first and second gas generating chambers are disposed in one of parallel, adjacent to each other, and at a distance from each other in the widthwise direction of said inflator housing.

20. An air bag system comprising an activation-signal outputting means including an impact sensor and a control unit, and a module case in which a hybrid inflator as claimed in any one of claims 1 to 3 and an air bag are accommodated.

21. A hybrid inflator as claimed in claim 14, wherein said first and second ignition means chambers are dispose adjacent to each other as well as in parallel in the widthwise direction of said inflator housing, said first ignition means chamber is disposed on the center axis in the longitudinal direction of said inflator housing.

* * * * *